(12) United States Patent
Rydin et al.

(10) Patent No.: US 7,091,277 B2
(45) Date of Patent: Aug. 15, 2006

(54) SYNTACTIC POLYOLEFIN COMPOSITION FOR PIPE COATING

(75) Inventors: Cecilia Rydin, Savedalen (SE); Carl-Gustav Ek, Vastra Frolunda (SE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/510,396

(22) PCT Filed: Apr. 16, 2003

(86) PCT No.: PCT/SE03/00607

§ 371 (c)(1), (2), (4) Date: Oct. 5, 2004

(87) PCT Pub. No.: WO03/087205

PCT Pub. Date: Oct. 23, 2003

(65) Prior Publication Data

US 2005/0165156 A1    Jul. 28, 2005

(30) Foreign Application Priority Data

Apr. 16, 2002  (SE)  .................... 0201129

(51) Int. Cl.
*A61K 9/16*  (2006.01)
(52) U.S. Cl. .............. 524/543; 524/474; 523/218; 523/219; 428/36.5
(58) Field of Classification Search .......... 524/543, 524/474, 1
See application file for complete search history.

(56) References Cited

U.S. PATENT DOCUMENTS

| | | | | |
|---|---|---|---|---|
| 5,218,016 A | * | 6/1993 | Jarrin et al. | ................. 523/219 |
| 6,251,995 B1 | | 6/2001 | Hesse et al. | |
| 2003/0157286 A1 | * | 8/2003 | Hesse et al. | ............... 428/36.5 |

FOREIGN PATENT DOCUMENTS

| | | |
|---|---|---|
| EP | 0 473 215 A1 | 3/1992 |
| EP | 0 521 582 | 1/1993 |
| EP | 0 557 807 | 9/1993 |
| EP | 0 575 012 | 12/1993 |
| WO | WO 93/19927 | 10/1993 |
| WO | WO 97/28213 | 8/1997 |
| WO | WO 99/05447 | 12/1999 |

OTHER PUBLICATIONS

"New Ways of influencing the toughness of isotactic polypropylene", Baran, Norbert et al, ISSN: 0322-7340. POLENG, 2000.*

* cited by examiner

*Primary Examiner*—David W. Wu
*Assistant Examiner*—Ives Wu
(74) *Attorney, Agent, or Firm*—Merchant & Gould P.C.

(57) ABSTRACT

The invention relates to a syntactic polyolefin composition for pipe coating, wherein the composition comprises a β-nucleated propylene polymer and microspheres. The invention also relates to a method for the preparation of the composition for pipe coating and to an off-shore pipe coated with the syntactic polyolefin composition.

25 Claims, No Drawings

SYNTACTIC POLYOLEFIN COMPOSITION FOR PIPE COATING

FIELD OF THE INVENTION

The present invention relates to a syntactic polyolefin composition for pipe coating, to a method for the preparation thereof and to an off-shore pipe coated with the syntactic polyolefin composition.

BACKGROUND OF THE INVENTION

Polyolefin coated pipes are used in off-shore applications for the transportation of hot fluids, e.g. crude oil, and are often installed at the sea-bottom, most often at depths of several hundred meters. For these applications steel pipes are preferred but also fibre reinforced pipes, advanced multilayer pipe constructions made of metal and/or polymer based layers, may be used. At these depths the temperature of the surrounding water is close to 0° C. which leads to extensive heat losses from the transported fluid and significantly reduces flow or causes blockage of the production lines. In order to efficiently pump, e. g. crude oil, it is required that the viscosity is sufficiently low, otherwise a higher pump efficiency or the installation of additional heating units along the pipeline will be necessary.

To meet the insulation requirements on off-shore pipes it has previously been suggested to coat the pipes with an insulating layer of so called syntactic polyolefins, i. e. composite polyolefin/filler materials in which the filler comprises hollow microspheres. As examples of the polyolefin used mention may be made of e. g. linear low density polyethylene, blends of propylene polymers and olefin copolymer elastomers or syntactic polypropylene.

A disadvantage of such syntactic polyolefin coatings is the insufficient mechanical properties of pipes provided with such coatings. At the depths in question the temperature difference between the surrounding water, often having a temperature as low as 0° C., and the inside of pipe, often having a temperature of 100–150° C., put high demands on the mechanical properties. The water pressure on the coating is substantial, and without sufficient compression strength the insulating coating will be compressed to a smaller thickness, thereby reducing its insulating capacity. Also, excellent mechanical properties are required for coated pipes in order to avoid cracking of the coating during installation handling and in service.

The term installation handling used herein means any installation technique such as coiling and uncoiling of the ready made pipelines, welding and other jointing techniques and on-shore or off-shore installation, e. g. off-shore installation at the sea-bottom. Installation of coated pipes, in particular for off-shore applications, involves tough conditions for the protective coating layer, including high stress, substantial elongation, surface damages, notches, impact events, etc, both at low and high temperature conditions and at high hydrostatic pressure. The coating layer is not only protecting the pipeline as such, but is also doing so in a state of high stress and/or at elevated temperatures and pressures, making the coating most sensitive to cracking, e. g. the stresses induced during coiling and uncoiling. During the service life of the coated pipeline, the coating has to protect the pipeline from damages and induced stress and crack formations at conditions close to 0° C., high hydrostatic pressures where a small damage or notch in the coating could propagate into a large crack putting the pipeline as such at risk. With a high dynamic fracture toughness of the coating material no cracks will occur during installation handling and in service.

Another problem is the difficulties in producing syntactic polyolefins. In particular, it is difficult to compound glass microspheres and other hollow spherical fillers into a thermoplastic polymer matrix at low enough shear forces to avoid crushing of the spheres during the process. Also, the thermal conductivity of an effective off-shore pipe insulation needs to be low. When about 15% or more of the spheres in the matrix are crushed, it is difficult to maintain the necessary low level of thermal conductivity. Furthermore, the structural properties of the syntactic polyolefin are also adversely affected. This problem cannot be avoided by adding a larger amount of microspheres since an excessive amount will cause additionally crushed microspheres due to higher forces involved during homogenisation, i. e. >15%, initiates cracks and further deteriorates the mechanical properties.

European Patent Application no EP-A-473 215 discloses polyolefin syntactic foams for pipeline insulation use, wherein microspheres that have been treated with a chain scission agent are added to a fluid stream of short chain polypropylene or polybutylene to form a syntactic foam insulative material. This method is taught as useful for producing material of a low thermal conductivity. However, the plastic starting materials taught for use therein are generally not optimal for submarine pipe insulation, because while the short chain polypropylene or polybutylene affords low breakage of the microspheres, the method requires the presence of a chain scission agent, coated on the microspheres. The chain-scission agent is employed to cause a narrowing of the molecular weight distribution of the polyolefin. Without the presence of this agent, the finished insulation would be unacceptable for use as off-shore pipe insulation, because it would not be hydrostatic pressure resistant, abuse resistant, or creep resistant.

SUMMARY OF THE INVENTION

The object of the invention is to provide a syntactic polyolefin composition for pipe coating wherein the above mentioned drawbacks have been eliminated or alleviated.

Thus, it is an object of the present invention to provide a syntactic polyolefin composition having superior thermal and mechanical properties which may be prepared on a large scale on currently available equipment.

According to the present invention this object is achieved by a syntactic polyolefin composition for pipe coating, characterised in that the composition comprises a β-nucleated propylene polymer and microspheres, said composition having a melt flow rate ($MFR_2$; ISO 1133, condition D) at 230° C./2.16 kg in the range of 0.05–30 g/10 min and in that the composition has an elongation at break of at least 3%.

A further object of the present invention is to provide a method for the preparation of a syntactic polyolefin composition for pipe coating, characterised in that microspheres are evenly distributed by melt mixing in a composition comprising a β-nucleated propylene polymer and hollow microspheres, said composition having a melt flow rate at 230° C./2.16 kg in the range of 0.05–30 g/10 min and in that the composition has an elongation at break of at least 3%.

Yet another object of the present invention is to provide an off-shore pipe coated with a syntactic polyolefin composition, characterised in that it is coated with a composition according to any one of claims 1–13.

By the syntactic polyolefin composition of the present invention it is possible to achieve a pipe coating for off-shore installations having low thermal conductivity and excellent mechanical properties.

Other distinguishing features and advantages of the invention will appear from the following specification and the appended claims.

DETAILED DESCRIPTION OF PREFERRED EMBODIMENTS

A characterising feature of the composition of the present invention is the presence of a β-nucleated propylene polymer. β-nucleated propylene polymers are isotactic propylene polymers composed of chains in a $3_1$ helical conformation having an internal microstructure of β-form spherulites being composed of radial arrays of parallel stacked lamellae. This microstructure can be realized by the addition of β-nucleating agents to the melt and subsequent crystallization. The presence of the β-form can be detected through the use of wide angle X-ray diffraction (Moore, J., Polypropylene Handbook, p 134–135, Hanser Publishers Munich, 1996).

In a preferred embodiment of the present invention the β-nucleated propylene polymer is a (co)polymer (i. e. a homopolymer or copolymer), characterised in that the β-nucleated propylene polymer is a (co)polymer which comprises at least 90.0 weight % of propylene and up to 10.0 weight % of α-olefins with 2 or 4 to 18 carbon atoms, and that the propylene polymer has a melt flow rate of 0.1–8 g/10 min at 230° C./2.16 kg.

According to a more preferred embodiment of the present invention the β-nucleated propylene polymer is a β-nucleated propylene block copolymer with 90.0 to 99.9 weight % of propylene and 0.1 to 10.0 weight % of α-olefins with 2 or 4 to 18 carbon atoms with a melt flow rate (MFR) of 0.1 to 40 g/10 min at 230° C./2.16 kg, preferably 0.1 to 8 g/10 min at 230° C./2.16 kg, whereby a test polyolefin pipe prepared from the β-nucleated propylene copolymer has a critical pressure of >25 bars and a dynamic fracture toughness of >3.5 MNm$^{-3/2}$ in the hydrostatic small scale steady state (hydrostatic S$_4$) test at 3° C.

The method of determining the dynamic fracture toughness is disclosed in Plastics, Rubber and Composites Processing and Applications, Vol. 26, No. 9, pp. 387 ff.

According to another advantageous embodiment, the β-nucleated propylene polymer is a β-nucleated propylene block copolymer having an IR$_τ$>0.98, a tensile modulus of ≧1100 MPa at 23° C. and a Charpy impact strength, notched, of ≧6 kJ/m$^2$ at −20° C. The IR$_τ$ of the propylene polymer is measured by Infrared spectroscopy and calculated as described in EP 0 277 514 A2, page 3.

The β-nucleated propylene polymer in the composition according to the present invention preferably has a melt flow rate of 0.1–70 g/10 min, more preferably 0.15–50 g/10 min, and most preferably 0.2–30 g/10 min at 230° C./2.16 kg.

According to a further preferred embodiment the β-nucleated propylene polymer has a tensile modulus of preferably ≧1300 MPa and most preferably ≧1500 MPa at 23° C.

Charpy impact strength of the β-nucleated propylene polymer is preferably ≧6 kJ/m$^2$ at −20° C., more preferably ≧9 kJ/m$^2$ at −20° C., most preferably ≧10 kJ/m$^2$ at −20° C.

According to a further embodiment, the β-nucleated propylene polymers are propylene copolymers obtained by polymerization with a Ziegler-Natta catalyst system comprising titanium-containing solid components, an organoaluminia, magnesium or titanium compound as cocatalyst and an external donor according to the formula

wherein R and R' are identical or different and are branched or cyclic aliphatic or aromatic hydrocarbon residues, and y and x independently from each other are 0 or 1, provided that x+y are 1 or 2.

A preferred external donor in the Ziegler-Natta catalyst system for producing the β-nucleated propylene block copolymers is dicyclopentyldimethoxysilane.

According to an advantageous embodiment the β-nucleated propylene copolymers contain 0,0001 to 2,0 wt %, based on the propylene copolymers used, of dicarboxylic acid derivative type diamide compounds from C$_5$–C$_8$-cycloalkyl monoamines or C$_6$–C$_{12}$-aromatic monoamines and C$_5$–C$_8$-aliphatic, C$_5$–C$_8$-cycloaliphatic or C$_6$–C$_{12}$-aromatic dicarboxylic acids, and/or diamine derivative type diamide compounds from C$_5$–C$_8$-cycloalkyl monocarboxylic acids or C$_6$–C$_{12}$-aromatic monocarboxylic acids and C$_5$–C$_8$-cycloaliphatic or C$_6$–C$_{12}$ aromatic diamines, and/or amino acid derivative type diamide compounds from amidation reaction of C$_5$–C$_8$-alkyl-, C$_5$–C$_8$-cycloalkyl- or C$_6$–C$_{12}$-arylamino acids, C$_5$–C$_8$-alkyl-, C$_5$–C$_8$-cycloalkyl- or C$_6$–C$_{12}$-aromatic monocarboxylic acid chlorides and C$_5$–C$_8$-alkyl-, C$_5$–C$_8$-cycloalkyl- or C$_6$–C$_{12}$-aromatic mono-amines, and/or quinacridone derivative compounds of the type quinacridone compounds, quinacridone-quinone compounds, and/or dihydroquinacridone type compounds, and/or dicarboxylic acid salts of metals from group IIa of periodic system and/or mixtures of dicarboxylic acids and metals from group IIa of periodic system, and/or salts of metals from group IIa of periodic system and imido acids of the formula

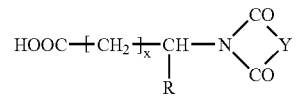

wherein x=1 to 4; R=H, —COOH, C$_1$–C$_{12}$-alkyl, C$_5$–C$_8$-cycloalkyl or C$_6$–C$_{12}$-aryl, and Y=C$_1$–C$_{12}$-alkyl, C$_5$–C$_8$-cycloalkyl or C$_6$–C$_{12}$-aryl -substituted bivalent C$_6$–C$_{12}$-aromatic residues, as β-nucleating agent.

Examples of the dicarboxylic acid derivative type diamide compounds from C$_5$–C$_8$-cycloalkyl monoamines or C$_6$–C$_{12}$-aromatic monoamines and C$_5$–C$_8$-aliphatic, C$_5$–C$_8$-cycloaliphatic dicarboxylic acids, optionally contained in the β-nucleated propylene copolymer, are N,N'-di-C$_5$–C$_8$-cycloalkyl-2,6-naphtalene dicarboxamide compounds such as N,N'-dicyclohexyl-2,6-naphtalene dicarboxamide and N,N'-dicyclooctyl-2-6-naphtalene dicarboxamide, N,N'-di-C$_5$–C$_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide, N,N'-di-C$_5$–C$_8$-cycloalkyl-terephthalamide compounds such as N,N'-dicyclohexylterephtalamide and N,N'-dicyclopentylterephtalamide, N,N'-di-$C_5$–$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide.

Examples of the diamine derivative type diamide compounds from $C_5$–$C_8$-cycloalkyl mono-carboxylic acids or $C_6$–$C_{12}$-aromatic monocarboxylic acids and $C_5$–$C_8$-cycloaliphatic or $C_6$–$C_{12}$-aromatic diamines, optionally contained in the β-nucleated propylene copolymer, are N,N'-$C_6$–$C_{12}$-arylene-bis-benzamide compounds such as N,N'-p-phenylene-bis-benzamide and N,N'-1,5-naphtalene-bis-benzamide, N,N'-$C_5$–$C_8$-cycloalkyl-bis-benzamide compounds such as N,N'-1,4-cyclopentane-bis-benzamide and N,N'-1,4-cyclohexane-bis-benzamide.

N,N'-p-$C_6$–$C_{12}$-arylene-bis-$C_5$–$C_8$-cycloalkylcarboxamide compounds such as N,N'-1,5-naphtalene-bis-cyclohexanecarboxamide and N,N'-1,4-phenylene-bis-cyclohexanecarboxamide.

N,N'-$C_5$–$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide.

Examples of the amino derivative type diamide compounds, optionally contained in the β-nucleated propylene copolymer, are N-phenyl-5-(N-benzoylamino)pentaneamide and/or N-cyclohexyl-4-(N-cyclohexylcarbonylamino)benzamide.

Examples of the quinacridone type compounds, optionally contained in the β-nucleated propylene copolymer, are quinacridone, dimethylquinacridone and/or dimethoxyquinacridone.

Examples of the quinacridonequinone type compounds, optionally contained in the β-nucleated propylene copolymer, are quinacridonequinone, a mixed crystal of 5,12-dihydro (2,3b)acridine-7,14-dione with quino(2,3b)acridine-6,7,13,14-(5H,12H)-tetrone as disclosed in EP-B 0 177 961 and/or dimethoxyquinacridonequinone.

Examples of the dihydroquinacridone type compounds, optionally contained in the β-nucleated propylene copolymer, are dihydroquinacridone, dimethoxydihydroquinacridone and/or dibenzodihydroquinacridone.

Examples of the dicarboxylic acid salts of metals from group IIa of periodic system, optionally contained in the β-nucleated propylene copolymer, are pimelic acid calcium salt and/or suberic acid calcium salt.

Examples of salts of metals from group IIa of periodic system and imido acids of the formula

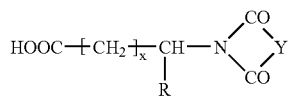

optionally contained in the β-nucleated propylene copolymer, are the calcium salts of phtaloylglycine, hexahydrophtaloylglycine, N-phtaloyl-alanine and/or N-4-methylphtaloylglycine.

According to the invention the β-nucleated propylene polymer is mixed with microspheres, which may be made of various organic and inorganic materials, such as glass, epoxy resin, phenolic resin or urea-formaldehyde resin. The microspheres should be rigid, i. e. non-compressible, and should have a density of at most about 0.8 g/cm³, preferably at most about 0.4 g/cm³. The outer diameter of the microspheres should be 1–500 µm, preferably 5–200 µm and preferably the microspheres are hollow. A preferred material is an inorganic glass, preferably a silica based glass, or a polymer or ceramics, a rigid foam structure, etc.

In the present invention the microspheres are preferably untreated, i. e. they do not need any pretreatment with chain scission agent in order to achieve an even distribution of the microspheres and excellent mechanical properties. This is an advantage compared to the prior art such as EP-A-473 215 mentioned above.

The density of the composition of β-nucleated propylene polymer mixed with hollow microspheres should preferably be 500–850 kg/m³ and more preferably 600–800 kg/m³.

Preferably, the microspheres are present in the composition in an amount of from 10 to 50 weight %, preferably 15 to 35%, more preferably 20–30 weight % of the composition.

In order to improve the distribution of microspheres within the polymer matrix, to reduce the amount of microspheres crushed during processing, and to improve the processability, the MFR of the β-nucleated propylene polymer may be increased by the incorporation into the polymer matrix of a polyolefin, having a MFR of 100–1500, preferably 400–1200 g/10 min at 230° C./2.16 kg. The amount of polyolefin, e. g. polyethylene or polypropylene should be 0–30 weight %, preferably 10–25 weight %.

The syntactic polyolefin composition of the present invention may contain usual auxiliary materials, such as 0.01 to 2.5 wt % stabilizers and/or 0.01 to 1 wt % processing aids, and/or 0.1 to 1 wt % antistatic agents and/or 0.2 to 3 wt % pigments, in each case based on the polymers used.

As stabilizers, preferably mixtures of 0.01% to 0.6 wt % phenolic antioxidants, 0.01% to 0.6 wt % 3-arylbenzofuranones, 0.01% to 0.6 wt % processing stabilizers based on phosphites, 0.01% to 0.6 wt % high temperature stabilizers based on disulfides and thioethers and/or 0.01% to 0.8 wt % sterically hindered amines (HALS), are suitable.

The melt flow rate (MFR), which is equivalent to the term "melt index" previously used, is an important property of the syntactic polyolefin composition for pipe coating according to the invention. The MFR is determined according to ISO 1133 and is indicated in g/10 min. The MFR is an indication of the flowability, and hence the processability, of the polymer. The higher the melt flow rate, the lower the viscosity of the polymer composition. The MFR is determined at different loadings such as 2,16 kg ($MFR_2$; ISO 1133, condition D). In the present invention the composition has an $MFR_2$ in the range of 0.05–30 g/10 min at 230° C./2.16 kg, more preferably in the range of 0.5–10 g/10 min at 230° C./2.16 kg and most preferably in the range of 1.0–5 g/10 min.

Another important property of the syntactic polyolefin composition for pipe coating according to the invention is the elongation at break, which is determined according to ISO 527-2/5A, sample thickness 2 mm, 100 mm/min, at ambient temperature of 23° C. The elongation at break is a measure of the flexibility of the material and consequently its ability to endure handling, such as coiling, reeling, etc without the formation of cracks. During coiling of the pipe the extension of the insulating layer may be up to about 5%, which requires a sufficiently ductile material. According to the invention the composition has an elongation at break of at least 3%, preferably at least 5%, and more preferably at least 10%.

The tensile modulus is a measurement of the rigidity of the material and its ability to withstand high water pressures. The tensile modulus of the composition should preferably be at least 1500 MPa determined according to ISO 527-2/1B, sample thickness 4 mm, 1 mm/min, 23° C.

Another property indicating the ability of the composition to endure high water pressures is the compression strength determined according to ASTM D 695. At the present invention this compression strength should preferably be $\geq 10$ MPa and more preferably $\geq 15$ MPa.

As previously stated the thermal conductivity of an effective off-shore pipe insulation needs to be low in order to attain the desired low level of thermal conductivity. According to the invention the composition preferably has a K-value of less than 0.20 W/m° K, preferably less than 0.17 W/m° K.

The present invention also relates to a method for the preparation of a syntactic polyolefin composition for pipe coating, in which hollow microspheres are evenly distributed by melt mixing in a composition comprising a β-nucleated propylene polymer and hollow microspheres, said composition having a melt flow rate at 230° C./2.16 kg in the range of 0.05–30 g/10 min, more preferably in the range of 0.5–10 g/10 min and most preferably in the range of 1.0–5 g/10 min, and in that the composition has an elongation at break of at least 3%, more preferably >5%, and most preferably >10%.

The method is generally carried out in a compounding or extruder unit, preferably in a co-rotating or counter-rotating twin screw extruder, or in an internal mixer such as a Banbury type mixer or in a single screw extruder such as a Buss Co-kneader or in a conventional single screw extruder. Static mixers such as Kenics, Koch, etc can also be used in addition to the compounding or extruder units mentioned in order to improve the distribution of the microspheres in the polymer matrix. Pellets of β-nucleated propylene block (co)polymer and optionally a propylene homopolymer are fed into the extruder. When the polymer is melted the hollow microspheres are added to the melted polymer, more preferably at a melt temperature of 30° C. above the melt temperature of the polymer, most preferably 50° C. above the melt temperature of the polymer in a ratio to achieve the desired K-value of the composition. The microspheres and polymer are mixed in the extruder until the microspheres are evenly distributed in the molten polymer. The molten and homogenised compound is then fed from the extruder and either pelletized for subsequent use or used directly to coat a pipe and prepare a syntactic polyolefin coated pipe according to the present invention. Direct coating of the pipes is preferred and includes both the pipe coating process based on co-extrusion, i. e. coating the complete circumference at the same time or by extrusion of a tape or film wounded around the pipe in a continuous process.

As indicated above the off-shore pipe coated with a syntactic polyolefin composition of the present invention is preferably prepared by extruding the syntactic polyolefin composition of the invention, e. g. in connection with the preparation thereof by melt mixing onto the pipe. Such direct coating of the pipes in a continuous process has the advantages that intermediate processing steps involving cooling, pelletizing and remelting may be omitted. In this way the tough treatments of pelletizing and especially remelting in an extruder, which normally to a substantial extent is performed by friction forces, are avoided. The result of such treatments is inevitably a large amount of crushed microspheres with accompanying higher heat conductivity and loss in mechanical properties. The pipe may be pretreated by coating with an epoxy resin layer and an compatibilizing layer on the epoxy resin layer before the coating with the syntactic polyolefin composition. The thickness of the coating preferably is at least about 1–100 mm, more preferably 20–50 mm.

The present invention will now be illustrated by way of non-limiting examples of preferred embodiments in order to further facilitate the understanding of the invention.

EXAMPLES

Preparation of a β-Nucleated Propylene Block Copolymer.

A mixture of 90 weight % of a propylene block copolymer, obtained by combined bulk and gas phase polymerization using a Ziegler-Natta catalyst system with dicyclopentyldimethoxysilane as external donor, having an ethylene content of 8.3 weight %, an $IR_\tau$ of the propylene homopolymer block of 0.985 and a melt flow rate of 0.30 g/10 min at 230° C./2.16 kg, 10 weight % of a master batch comprising 99 parts by weight of a propylene block copolymer having an ethylene content of 8.3% by weight, an $IR_\tau$ of the propylene homopolymer block of 0.985 and a melt flow rate of 0.30 g/10 min at 230° C./2.16 kg, and 1 part by weight pimelic acid calcium salt, and 0.1 weight % calcium stearate, 0.1 weight % tetrakis[methylene(3,5-di-t-butyl-hydroxyhydrocinnamate)]methane and 0.1 weight % tris-(2,4-di-t-butylphenyl)phosphite, based on the sum of the propylene polymers used, is melted in a twin screw extruder with a temperature profile of 100/145/185/210/220/225/225/225/220/200/185° C., homogenized, discharged and pelletized. The resulting propylene copolymer has a melt flow rate of 0.32 g/10 min at 230° C./2.16 kg, a tensile modulus of 1290 MPa and a Charpy impact strength, using notched test specimens, of 39 kJ/m² at −20° C.

Physical Properties of Microspheres

The used miccrospheres were Scotchlite™ Glass Bubbles having a density within the range of 0.35–0.41 g/cm³, measured in accordance with ASTM D284 (1976 edition) and a bulk density in the range of 0.19–0.28 g/cm³. Isostatic test pressure evaluation, at a test pressure of 38.5 MPa, calculated from the change in density of a sample (mixed with talc) after exposure to dry nitrogen, resulted in % of survival of at least 80% and typically 90%. Floatation, % by bulk volume, was typically 94%. Test values were typical when material was sampled in accordance with ASTM D2841 (1988 edition).

Example 1–3

Preparation of a Composition Comprising a β-Nucleated Propylene Polymer, a Propylene Homopolymer and Hollow Microspheres.

Pellets of β-nucleated propylene block copolymer having a MFR of 0.3 g/10 min at 230° C./2.16 kg prepared as described above and pellets of a polypropylene homopolymer having a MFR of 400 g/10 min at 230° C./2.16 kg, were fed into the first mixer inlet of a Buss Co-Kneader 100 MDK/E-11L/D, i. e. a single screw mixer with a downstream discharge single screw extruder with a pelletizing unit cutting pellets in the molten stage and cooled via water. The mixer temperatures were set to 200–240° C., from first inlet to outlet, screw temperature to 210° C. and the discharge extruder to around 230° C. The mixer screw RPM was 170–190 rpm and the throughput 100–150 kg/h. Untreated microspheres, as specified above, were fed into the molten polymer in the second mixer inlet downstream. The compositions of the composite material are set forth in Table 1. The composite material was extruded and pelletized.

TABLE 1

| | Example 1 Weight % | Example 2 weight % | Example 3 Weight % |
|---|---|---|---|
| Propylene block co-polymer, MFR 0.3 | 58.10 | 48.10 | |
| Propylene block co-polymer MFR 4.0 | | | 83.8 |
| Homopolypropylene, MFR 450 | 15.00 | 20.00 | |
| β-nucleator | 1.2 | 1.2 | 1.2 |
| Glass microspheres | 25.00 | 30.00 | 15.00 |
| Stabilizers | 0.74 | 0.74 | 0.74 |

The resulting properties from plaques compression moulded at 220° C. are presented in Table 2.

TABLE 2

| Property | Example 1 | Example 2 | Example 3 |
|---|---|---|---|
| $MFR_2$ at 230° C./2.16 kg, ISO 1133 | 0.55 | 0.9 | 5.4 |
| Density, $kg/m^3$ ISO 1183 | 690 | 650 | 739 |
| K-value, W/m° K, ASTM C177 | 0.174 | | 0.188 |
| Fraction of broken microspheres, % | 14 | 8 | |
| Tensile stress at yield, MPa, ISO 527 | 6 | 12 | 12 |
| Elongation at break, % ISO 527 | 98 | 7.6 | 9.4 |
| Tensile modulus, Pa, ISO 527 | 1900 | | |
| Compression strength at 5% compression, MPa, ASTM D695 | 17.8 | | |

From Table 2 it can be seen that the composition according to the invention provides a composite material which is well suited for insulating purposes, having a K-value of 0.174 W/m° K and a density of 650–690 $kg/m^3$. The mechanical properties of the composition are excellent with a high elongation at break of 98% and a tensile modulus of 1900 MPa. The compounding of the β-nucleated propylene polymer of MFR 0.3 g/10 min at 230° C./2.16 kg and the propylene homopolymer of MFR 400 g/10 min at 230° C./2.16 kg results in a composition having a MFR of 0.55–0.9 g/10 min at 230° C./2.16 kg, and thus makes it possible to incorporate the hollow microspheres into the composition without any significant breakage of the microspheres. These values correspond to the values attained in the ready made pipe coating, wherein compounding/homogenisation and pipe extrusion is performed in a continuous step, i. e. without extrusion remelting which causes an additional amount of crushed microspheres.

Example 4

In order to simulate a two step procedure, wherein melt compounding and/or homogenisation and palletising and/or solidification is accomplished in a first step and pipe extrusion including remelting in a subsequent second step, the pellets manufactured in example 1 were extruded in a labextruder through a tape die having a cross section of 30×2 mm. The labextruder was a standard screw compression screw with a RPM of 30, a screw length L/D of 30 and a screw diameter of 30 mm. The compression ratio was 1:3, the set temperature 220° C., and the melt temperature 225° C. The resulting properties from plaques made of the tapes by compression moulding at 220° C., are presented in Table 3.

TABLE 3

| Property | Example 4 |
|---|---|
| $MFR_2$ at 230° C./2.16 kg, ISO 1133 | 0.57 |
| Density, $kg/m^3$ ISO 1183 | 722 |
| K-value, W/m° K, ASTM C177 | 0.18 |
| Fraction of broken microspheres, % | |
| Tensile stress at yield, MPa, ISO 527 | 6 |
| Elongation at break, % ISO 527 | 79 |

From the resulting properties presented in Table 3 it can be concluded that a second extrusion step including remelting by extrusion still gives suitable values for the application, e. g. a K-value of 0.18 W/m° K and an elongation at break of 79%.

Comparative Examples 5 and 6

Pellets of propylene block copolymer were prepared as described above for examples 1–3.

TABLE 4

| | Example 5 Weight % | Example 6 weight % |
|---|---|---|
| Propylene block co-polymer, MFR 1.0 | 70 | |
| Propylene block co-polymer MFR 8.0 | 5 | 20 |
| Glass microspheres | 25 | 20 |

The resulting properties from plaques compression moulded at 220° C. are presented in Table 5.

TABLE 5

| Property | Example 5 | Example 6 |
|---|---|---|
| $MFR_2$ at 230° C./2.16 kg, ISO 1133 | 0.38 | 2.5 |
| Density, $kg/m^3$ ISO 1183 | 681 | 722 |
| Tensile stress at yield, MPa, ISO 527 | 8.7 | 13 |
| Elongation at break, % ISO 527 | 0.1 | 2.2 |

From the resulting properties presented in Table 5 it is evident that compositions without the addition of a β-nucleating agent have inferior mechanical properties in comparison to the compositions according to the invention given in examples 1–4.

The invention claimed is:

1. A syntactic polyolefin composition for pipe coating, wherein the composition comprises:
   a β-nucleated propylene polymer comprising 0.0001–2.0 weight % of a β-nucleating agent,
   a polyolefin homopolymer having a melt flow rate of 100–1500 g/10 min at 230° C./2.16 kg, and
   microspheres, said composition having a melt flow rate (MFR$_2$; ISO 1133, condition D) at 230° C./2.16 kg in the range of 0.05–30 g/10 min and an elongation at break of at least 3%.

2. A syntactic polyolefin composition according to claim 1, wherein said composition has a melt flow rate (MFR$_2$; ISO 1133, condition D) at 230° C./2.16 kg in the range of 0.5–10 g/10 min.

3. A syntactic polyolefin composition according to claim 1, wherein said composition has an elongation at break of >5%.

4. A syntactic polyolefin composition according to claim 1, wherein the β-nucleated propylene polymer is a (co) polymer which comprises at least 90.0 weight % of propylene and up to 10.0 weight % of α-olefins with 2 or 4 to 18 carbon atoms, and that the propylene polymer has a melt flow rate of 0.1–8 g/10 min at 230° C./2.16 kg.

5. A syntactic polyolefin composition according to claim 1, wherein the amount of polyolefin is 0–20 weight %.

6. A syntactic polyolefin composition according to claim 1, wherein the tensile modulus of the composition is at least 1500 MPa determined according to ISO 527.

7. A syntactic polyolefin composition according to claim 1, wherein the compression strength at 20 MPa/80° determined according to ASTM D695, is >10 MPa.

8. A syntactic polyolefin composition according to claim 1, wherein the K-value of the composition is less than 0.190 W/m° K.

9. A syntactic polyolefin composition according claim 1, wherein the density of the composition is 500–850 kg/m3.

10. A syntactic polyolefin composition according to claim 1, wherein said microspheres are made of glass, ceramics, epoxy resin, phenolic resin or urea-formaldehyde resin.

11. A syntactic polyolefin composition according to claim 1, wherein said microspheres are untreated microspheres.

12. A syntactic polyolefin composition according to claim 1, wherein said microspheres have an outer diameter of 1–500 μm.

13. A syntactic polyolefin composition according to claim 1, wherein said microspheres are hollow.

14. A syntactic polyolefin composition according to claim 1, wherein said microspheres are present in an amount of 10–50 weight % of the composition.

15. A method for the preparation of a syntactic polyolefin composition for pipe coating according to claim 1, wherein the microspheres are evenly distributed by melt mixing in a composition comprising a β-nucleated propylene polymer and microspheres, said composition having a melt flow rate at 230° C./2.16 kg in the range 0.05–30 g/10 min and in that the composition has an elongation at break of at least 3%.

16. A method according to claim 15, wherein said microspheres are added to the molten polymer.

17. A method according to claim 15, wherein the composition is compounded/homogenised and extruded as a coating on an off-shore pipe in one continuous step.

18. A method according to claim 15, wherein the composition is pelletized in a first step and in a subsequent step extruded as a coating on an off-shore pipe.

19. An off-shore pipe coated with a syntactic polyolefin composition, wherein the pipe is coated with a composition according to claim 1.

20. A syntactic polyolefin composition according to claim 1, wherein said composition has a melt flow rate (MFR$_2$; ISO 1133, condition D) at 230° C./2.16 kg in the range of 1.0–5 g/10 min.

21. A syntactic polyolefin composition according to claim 1, wherein said composition has an elongation at break of >10%.

22. A syntactic polyolefin composition according to claim 1, wherein the amount of polyolefin is 15–20 weight %.

23. A syntactic polyolefin composition according to claim 1, wherein the compression strength at 20 MPa/80° determined according to ASTM D695, is >15 MPa.

24. A syntactic polyolefin composition according to claim 1, wherein said microspheres have an outer diameter of 5–200 μm.

25. A syntactic polyolefin composition according to claim 1, wherein said microspheres are present in an amount of 20–30 weight % of the composition.

* * * * *